United States Patent

[11] 3,549,794

[72] Inventor William H. Slavik
Oak Lawn, Ill.
[21] Appl. No. 798,719
[22] Filed Feb. 12, 1969
[45] Patented Dec. 22, 1970
[73] Assignee Motorola Inc.
Franklin Park, Ill.
a corporation of Illinois

[54] DEMODULATOR CIRCUIT
14 Claims, 1 Drawing Fig.

[52] U.S. Cl. .......... 178/5.4, 324/50
[51] Int. Cl. .......... H04n 9/50
[50] Field of Search .......... 178/5.4SD, 5.4SYNC, 5.4; 329/50

[56] References Cited

UNITED STATES PATENTS 3,405,229 10/1968 Parker .......... 178/5.4SD

*Primary Examiner*—Robert L. Griffin
*Assistant Examiner*—Richard P. Lange
*Attorney*—Mueller, Aichele & Rauner

ABSTRACT: A demodulator for a composite color television signal includes a transistor, the base of which is supplied with the color subcarrier and reference oscillator signal components and the emitter of which is supplied with the low frequency brightness signal components to produce a signal at the collector which is a result of the color and the low frequency brightness components. This output signal then is combined with the remainder of the brightness signal components in order to produce a composite signal representing brightness, hue and saturation components of the television image.

PATENTED DEC 22 1970 3,549,794
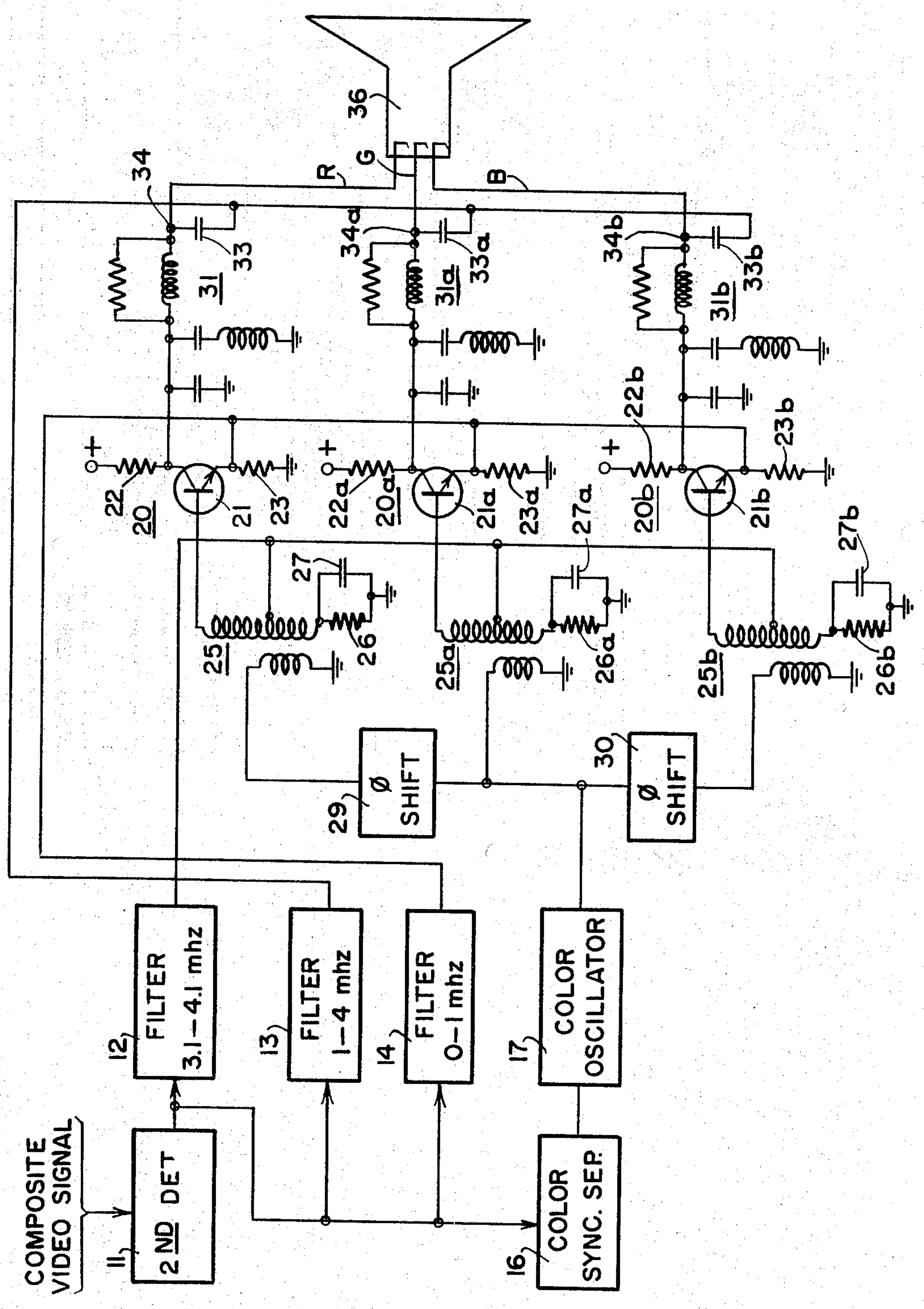
Inventor
WILLIAM H. SLAVIK
BY Mueller, Aichele & Rauner
ATTYS.

DEMODULATOR CIRCUIT

BACKGROUND OF THE INVENTION

The presently used color television signal is comprised of brightness or luminance components in a frequency range from zero to several megacycles and a frequency and amplitude modulated subcarrier at approximately 3.58 mhz. which represents the hue and saturation of the image, that is "-color less brightness." The brightness components and the modulated subcarrier overlap in frequency to restrict the bandwidth and to conserve spectrum use. Interference between these signal components is limited because each is comprised of energy bunches which are interleaved in the spectrum in accordance with known principles.

In many instances the color or chroma subcarrier is band-selected and synchronously demodulated at three different phases to produce color difference signals (R–Y, B–Y, and G–Y) which are subsequently combined with the brightness signal Y to produce color representative signals R, B and G for reproducing a composite image in the picture tube. In a system of this type, it is necessary to provide for four amplifying channels, one for each of the three color difference signals and one for the brightness component of the signal.

In other color television systems, a composite signal has been applied directly to a demodulator so that a color representative signal is produced without matrixing operation, but systems of this type have not been altogether satisfactory, because a spurious signal is developed, due to the close spectrum relationship of the brightness and subcarrier components, causing the reproduced television image to be impaired by a spurious pattern. It is desirable, however, to utilize such a direct demodulator since it eliminates the necessity of the separate amplifying channel required in systems where the brightness components are shunted around the demodulator for the subcarrier components.

SUMMARY OF THE INVENTION

Accordingly, it is an object of this invention to provide a color signal demodulator having simplified circuitry.

It is another object of this invention to provide a color signal demodulator for producing red, green and blue color representative signals, utilizing a partially bypassed brightness channel in order to eliminate the amplifying stage ordinarily required in the brightness signal channel.

An additional object of this invention is to provide an improved color demodulator in which the color and some of the brightness signals are processed in the same components.

A further object of this invention is to provide a color demodulator supplied with band-passed subcarrier signals and also supplied with bandwidth restricted brightness signals to produce a composite color signal at the output of the demodulator.

In accordance with a preferred embodiment of this invention, a band-passed subcarrier signal is supplied to a switching device where it is demodulated by also supplying a reference oscillator signal at the subcarrier frequency to the switch. Low frequency brightness signals also are supplied to the switch, causing the composite signal appearing at the output of the switch to be a resultant of the demodulated color signal and the low frequency brightness information. The full video response is recovered by adding the remaining portion of the brightness signal to the composite color signal obtained from the switch.

BRIEF DESCRIPTION OF THE DRAWING

The single FIG. of the drawing is a schematic diagram, partially in block form, of a preferred embodiment of the invention.

DETAILED DESCRIPTION

Referring now to the drawing, there is shown a schematic diagram of a television receiver embodying a demodulator according to a preferred embodiment of the invention. Only those portions of a television receiver which are necessary and useful in explaining the invention are shown in the drawing, and it will be apparent to those skilled in the art that additional standard components must be added to the components shown in the drawing in order to complete the television receiver. For example, standard components which have not been shown but which are found in a television receiver include the sound circuits and the horizontal and vertical deflection circuits. Since these portions of the television receiver form no part of this invention, they and other standard circuits have been omitted for the sake of clarity.

In the embodiment of the invention shown in the drawing, a composite color television signal, including video frequency brightness components and a subcarrier wave modulated in amplitude and phase to represent color information, is applied to a video second detector 11 which is of a type conventionally found in color television receivers. The output of the detector 11 is supplied to a band-pass filter 12, which passes frequencies in the range of 3.1 to 4.1 mhz. (which in the NTSC television signal includes the color subcarrier signal components). In addition, the output of the second detector 11 is supplied to another bandpass or high pass filter 13 which passes signals in the frequency range from 1 to 4 mhz. encompassing the upper range of the video brightness components, and the detector output also is supplied to the input of a low pass filter 14 which passes signals in the frequency range from 0 to 1 mhz., thereby providing an output corresponding to the lower frequency range of the brightness components. Finally, the composite signal obtained from the detector 11 is supplied to a standard color synchronization separating circuit 16, the output of which is used to synchronize and phase-lock the operation of a color reference oscillator 17.

In order to demodulate the composite signal obtained from the second detector 11 into the respective red, green and blue color signals used to drive a conventional color cathode ray tube employing a three gun configuration, three substantially identical demodulator stages 20, **20*a* and 20*b* are provided to demodulate the red, green and blue color information signals. Since these three demodulator stages are the same, only the operation of the demodulator stage 20** will be provided in detail, with corresponding reference numbers bearing subfixes in the form of the letters *a* and *b* being provided for the other two stages. It is to be understood that the description of operation of the stage 20 also applies equally as well to the operation of the stages **20*a* and 20*b***.

Demodulation of signals in the demodulator 20 takes place by the operation of switching device in the form of an NPN transistor 21 supplied with operating potential from a source of B+ through a collector resistor 22, with the emitter of the transistor 21 being connected through an emitter resistor 23 to ground. The base of the transistor 21 is connected to one end of the secondary winding of an input transformer 25 with the other end of the secondary winding being connected to ground through a parallel connected RC circuit consisting of a resistor 26 and a capacitor 27, which are chosen to have characteristics which match the input resistance and capacitance of the transistor 21.

The band-passed subcarrier signals obtained from the output of the band-pass filter 12 are supplied in parallel to the center taps of each of the secondary windings of the transformers 25, **25*a*, and 25*b*** for the three color demodulators.

In order to demodulate the color subcarrier signal, the 3.58 mhz. oscillator signal is appropriately phase-shifted by a pair of phase-shifting circuits 29 and 30, the outputs of which are connected to the primary windings of the transformers 25 and **25*b*, and the output of the oscillator 17 is connected directly to the primary winding of the transformer 25*a*. As a consequence, the 3.58 mhz. reference oscillator signal applied to the primary windings of each of the three transformers 25, 25*a* and 25*b*** is phase-shifted to correspond to the phase of the appropriate color signal to be demodulated in the corresponding demodulator stage.

The application of the subcarrier signal to the center tap of the secondary winding of the transformers is at the zero point for the reference oscillator signal applied to the primary winding due to the balancing action caused by the resistor 26 and capacitor 27. This then prevents the reference signal applied to the primary winding of the transformers from feeding back into the band-pass filter 12.

The reference oscillator signal coupled from the primary winding of the transformer 25 to the secondary winding of the transformer and applied to the base of the transistor 21 drives the transistor alternately between conduction and nonconduction, causing it to operate as a switch to sample the signals obtained from the output of the filter 12 at the subcarrier frequency to thereby cause a demodulated color difference signal to appear on the collector of the transistor 21.

Simultaneously with the application of the subcarrier signal to the base of the transistor 21 through the secondary winding of the transformer 25, the low frequency portion of the brightness information component, that is, the portion of the video signal lying in the frequency range between O and 1 mhz., is applied from the output of the low pass filter 14 to the emitter of the transistor 21. As a consequence, the output of the transistor 21 appearing on its collector is a composite signal consisting of the demodulated color difference signal combined with the low frequency portion of the brightness signal components. The cutoff frequency of 1 mhz. for the filter 14 is chosen to prevent the demodulated brightness components appearing on the collector of the transistor 21 from being less than 1 mhz., in order that appropriate filtering of the collector output can be utilized to eliminate the spurious signal components which occur due to the demodulation products caused by interaction of the brightness signal components with the reference signal obtained from the oscillator 17.

Along with the demodulated color components appearing on the collector of the transistor 21, there also appear demodulated brightness product signal components in the frequency range from 2.58 mhz. to 4.58 mhz. and these brightness products, along with the 3.58 mhz. oscillator reference signal must be filtered from the output signal. This is accomplished by providing a low pass rolloff filter 31 which may be of any suitable type having a frequency response of from 0 to 1 mhz. By utilizing such a filter, only the desired low frequency demodulated color difference signal combined with a portion of the amplified low frequency brightness signal component appears at the output of the filter 31, with the unwanted brightness signal product components being eliminated.

In order to recover the full video response, the remaining brightness signal components obtained from the output of the filter 13 are applied through a coupling capacitor 33 to a junction 34 at the output of the filter 31, with the junction 34 being connected to the corresponding cathode of the three gun color cathode ray tube 36. Since the low frequency portion of the brightness signal is applied to the emitter of the transistor 21, this portion of the video brightness signal is amplified by the transistor 21 along with the demodulated color difference signal, causing sufficient amplification of the brightness signal components to take place; so that no additional amplifier for the brightness signal is necessary in the circuit path between the output of the filter 13 and the junction 34. At the same time, the high frequency brightness signal components are shunted around or bypass the demodulator sections 20, **20*a* and 20*b*; so that no undesirable low frequency intermodulation products between these brightness signal components and the 3.58 mhz. reference signal obtained from the oscillator 17 are passed through the demodulator transistors 21, 21*a* and 21*b***.

Although the demodulator transistors 21, **21*a* and 21*b* may provide sufficient amplification of the signals to properly drive the tube 36, additional amplifiers may be utilized between the junctions 34, 34*a*, 34*b* and the corresponding cathodes of the cathode ray tube 36** if additional amplification of the signals is desired.

From the foregoing, it can be seen that, by the use of simple and inexpensive filters, coupled with the direct application of the low frequency brightness components to the demodulator transistors, it is possible to demodulate the color signals directly with some brightness components, while, at the same time, eliminating the undesirable intermodulation products which would occur from demodulation of the higher frequency brightness signals, and to eliminate the additional amplifier ordinarily required in the brightness channel of a shunted brightness or luminance system.

I claim:

1. A color television receiver for receiving a composite signal including video frequency brightness components and a subcarrier signal modulated in amplitude and phase to represent color information, said subcarrier signal having modulation components at least partially overlapping in frequency the brightness components with an oscillator circuit providing an oscillator signal at the subcarrier frequency and of selected phase for demodulating one phase of the modulated subcarrier, said receiver having a demodulator circuit including in combination:
   - first circuit means responsive to the composite signal for developing therefrom the color subcarrier signal;
   - second circuit means responsive to the composite signal for developing therefrom a second signal having brightness component frequencies less than a first predetermined frequency;
   - third circuit means responsive to the composite signal for developing therefrom a third signal having brightness component frequencies greater than said first predetermined frequency;
   - a switching device responsive to the oscillator signal for being rendered alternately conductive and nonconductive thereby;
   - means for applying the outputs of the first circuit means and the second circuit means to the switching device, the output of which includes demodulated color difference signals and brightness signal components; and
   - means for combining the output of the switching means and the output of the third circuit means to produce a color representative signal including color and brightness information.

2. The combination according to claim 1 wherein the switching device is an amplifying device having three electrodes including an output electrode and two input electrodes and wherein the oscillator signal and the output of the first circuit means are applied to one input electrode and wherein the output of the second circuit means is applied to the other input electrode.

3. The combination according to claim 2 wherein the amplifying device is a transistor with the output electrode being the collector electrode, the first input electrode being the base, and the second input electrode being the emitter.

4. The combination according to claim 3 wherein the base of the transistor is connected through the secondary winding of a transformer to a point of reference potential, and wherein the oscillator signal is applied to the primary winding of the transformer, with the output of the first circuit means being applied to a center tap on the secondary winding of the transformer.

5. The combination according to claim 4 wherein the end of the secondary winding of the transformer remote from the end connected to the base of the transistor is connected through a matching circuit, the characteristics of which match the input characteristics of the transistor.

6. The combination according to claim 1 wherein the first, second and third circuit means all are filter means with said first circuit means being a band-pass filter for passing the subcarrier signal, the second circuit means being a low pass filter for passing low frequency brightness components, and the third circuit means being a band-pass filter for passing brightness signal components in a range extending from the upper frequency passed by the second filter means to a second frequency which is the upper frequency for the brightness signal components.

7. The combination according to claim 6 further including a fourth filter means connected between the output of the transistor and the input of the combining means, said fourth filter being a low pass filter, the upper frequency passed thereby being substantially the same as the upper frequency passed by the second filter means.

8. The combination according to claim 6 wherein the switching device is an amplifier means having first and second input electrodes and an output electrode, with the oscillator signal and the output of the first filter means being applied to one input electrode, with the second input electrode being supplied with signals from the output of the second filter means and with the output electrode being connected to one input of the combining means.

9. The combination according to claim 8 wherein the amplifier means is a transistor means having first and second input electrodes and an output electrode.

10. The combination according to claim 9 wherein the transistor has base, emitter and collector electrodes with the first input electrode corresponding to the base electrode, the second input electrode corresponding to the emitter electrode, and the output electrode corresponding to the collector electrode of the transistor.

11. The combination according to claim 10 further including fourth filter means connected between the collector electrode and the input to the combining means, with the fourth filter means being a low pass filter having substantially the same response characteristics as the second filter means.

12. A color television demodulation system for utilizing a composite signal including video frequency brightness components and a subcarrier signal modulated in amplitude and phase to represent color information, said subcarrier signal having modulation components at least partially overlapping in frequency the brightness components, with an oscillator circuit providing an oscillator signal at the subcarrier frequency and of selected phase for demodulating one phase of the modulated subcarrier, said demodulation system including in combination:

- a first band-pass filter supplied with the composite signal for passing the subcarrier signals;
- a low pass filter supplied with the composite signal for passing signals in the lower frequency range of the video brightness components;
- a third filter supplied with the composite signal for passing signals in the video frequency range extending from substantially the upper limit of the low pass filter to the upper limit of the video brightness signal components;
- a transistor having base, emitter and collector electrodes;
- a transformer the secondary winding of which is connected in circuit between the base electrode of the transistor and a point of reference potential;
- means for connecting the output of the oscillator circuit to the primary winding of the transformer;
- means for connecting the output of the first band-pass filter to the center tap of the secondary winding;
- means for connecting the output of the low pass filter to the emitter circuit of the transistor; and
- means for combining the output signals obtained from the collector of the transistor with the output of the third filter to produce a color representative signal.

13. The combination according to claim 12 further including a second low pass filter connected between the collector of the transistor and the combining means, said second low pass filter passing a range of signals of substantially the same frequency range as those passed by the first low pass filter.

14. The combination according to claim 12 wherein matching circuit means is connected between the point of reference potential and the secondary winding, the circuit characteristics of the matching circuit means being substantially the same as the input characteristics of the transistor connected to the other end of the secondary winding.